Patented Nov. 5, 1935

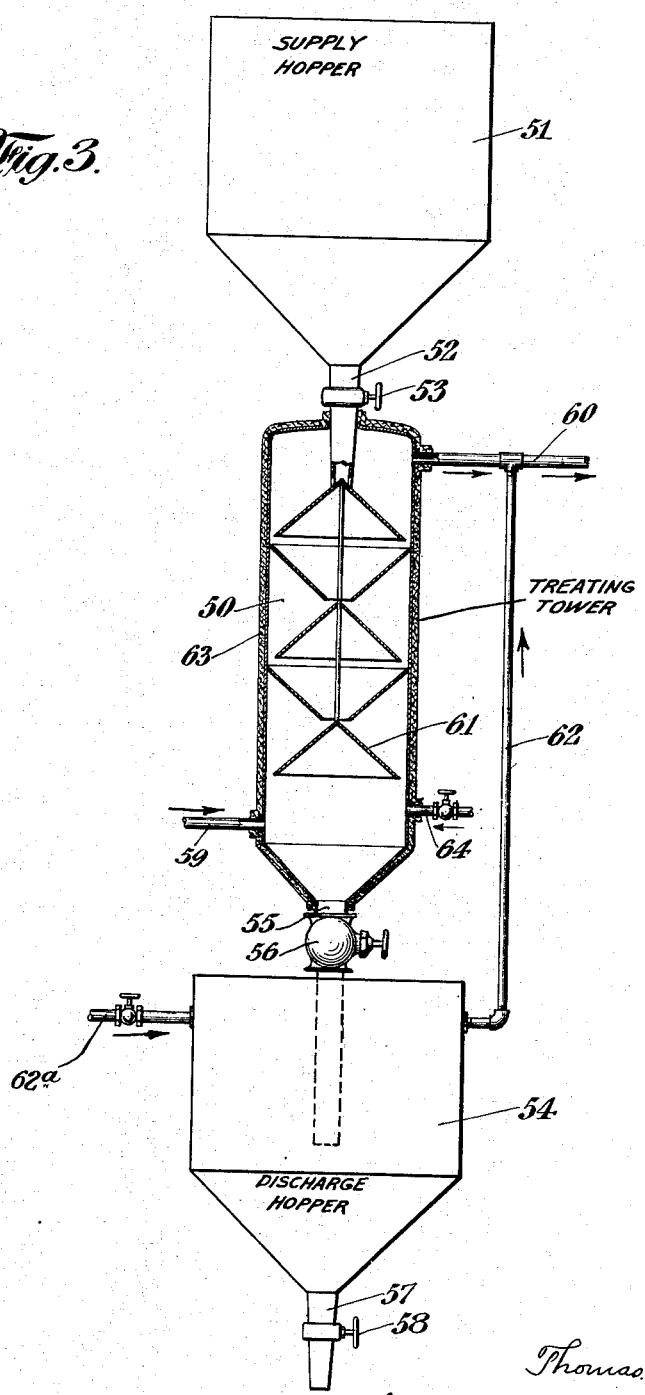

2,020,115

UNITED STATES PATENT OFFICE 2,020,115

TREATMENT OF PETROLEUM HYDROCARBONS

Thomas T. Gray, Elizabeth, N. J., assignor to The Gray Processes Corporation, Newark, N. J., a corporation of Delaware Application February 23, 1926, Serial No. 89,915
Renewed June 17, 1931

21 Claims. (Cl. 196—96)

This invention relates to treatment of petroleum hydrocarbons, and more particularly to the refining of cracked hydrocarbon products by treatment with solid adsorptive or catalytic material.

In applicant's Patent No. 1,340,889 of May 25, 1920, there is disclosed the treatment of hydrocarbons which comprises passing them in vapor form through a granular solid adsorptive treating material or catalytic agent contained in a tower. In time, the treating material may become inactive because of the deposit therein of substances resulting from the treatment and must be replaced or revived. This necessitates discontinuance of the use of the apparatus while the spent material is discharged and fresh material introduced.

An object of this invention is progressively to replace the treating material as it becomes inactive.

One way of attaining this object is by causing the treating material to flow through the treating tower in a continuous stream and causing the vapor to be treated to be brought into contact with the stream of treating material. This may be accomplished by providing a funnel-like shelf permeable to fluid, supplying the treating material to the shelf, and draining it off through a spout while directing the vapor stream through the treating material. The vapor may be directed either downwardly or upwardly through the treating material. The shelf may be permeable only adjacent the discharge spout so that the vapors are forced to pass through a considerable depth of treating material, thereby insuring proper treatment of the vapor and also insuring that the material has been efficiently utilized before being discharged from the tower.

Another way of accomplishing this object is to provide baffle plates in the tower and cause the treating material to flow down over the baffle plates while causing the vapor to be treated to rise up through the tower counter to the treating material. In either event, the inlet and discharge for the treating material are so related that the treating material moves through the tower at a proper rate to be discharged as it becomes inactive. The vapors are presented to a continuous stream of active treating material and the operation of the process may be continuous.

Contact of the vapors with the adsorptive material or catalytic agent is effective to polymerize the unstable unsaturated compounds present in the cracked vapor. These polymers have a higher boiling point than the vapors being treated and condense in the adsorptive material. They may be separated from the adsorptive material by being drained out through perforations in the shelf and collected separately from either the adsorptive material or the treated vapor. The latter is conducted to a suitable condenser where it is liquefied and collected. The treating material is thus continuously replenished and the treatment of the vapor is continuous while the separation of the polymers from the treating material is also continuous.

Other objects and novel features of this invention will be apparent from the following specification and accompanying drawings wherein the various figures disclose apparatus for refining hydrocarbons in accordance with the invention.

Figure 1 discloses the apparatus partly in vertical section;

Fig. 3 is a similar view of a modified form of tower.

Figure 1:
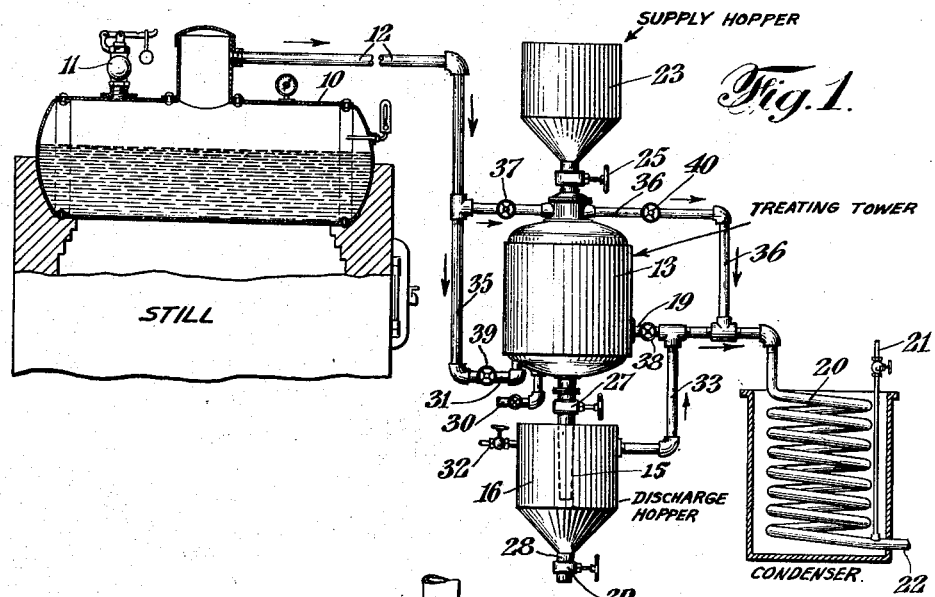
Figure 2:
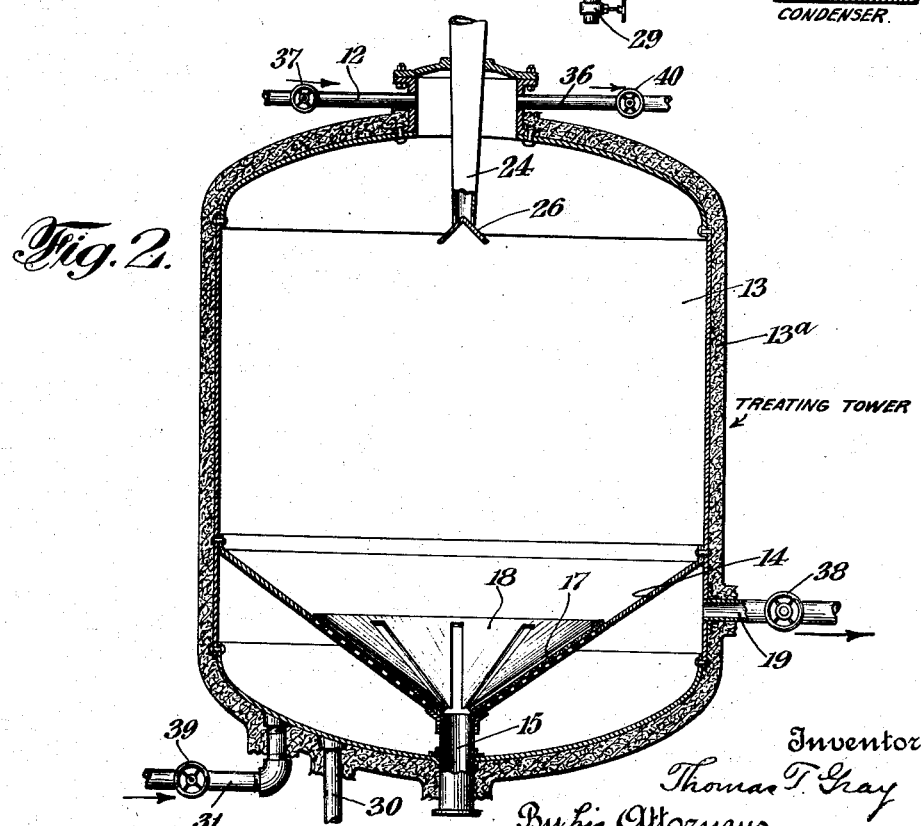
Fig. 2 is an enlarged sectional view of the treating tower.

10 represents a boiler-like holder fitted with a safety valve 11 and connected by a pipe 12 to the upper part of a tower 13. Near the bottom of the tower 13 is provided a funnel-shaped shelf 14 having its discharge spout 15 projecting through the bottom of the tank into a hopper 16. The shelf is perforated from the spout to a point a little more than halfway between the spout and the rim of the funnel. Over the perforations is laid a fine mesh wire cloth 17 and on the screen is arranged a slotted cone 18. A pipe 19 leads from the tower at a point below the shelf 14 to a condenser 20 equipped with a valve controlled vent 21, and which discharges into a collecting tank, not shown, through the pipe 22. A hopper 23 is located above the tower 13 and discharges thereinto through a spout 24 controlled by valve 25. At the lower end of the spout 24 is provided a spreader 26. The spout 15 is controlled by a valve 27. The hopper 16 discharges through a spout 28 controlled by a valve 29. A pipe 30 is provided in the bottom of the tower 13 to drain off any liquid which may collect in the bottom thereof. Steam may be supplied to the hopper 16 through the pipe 32. A pipe 33 connects the hopper 16 with the pipe 19.

In the operation of this device, the holder 10 is charged with hydrocarbon from which is to be obtained the vapor to be treated, and the shelf 14 is charged with the material to be used in the treatment of the hydrocarbon. The hopper 23 is also filled with the treating agent. The hydrocarbon is heated by fire or other suitable means to produce vapors which pass through the pipe 12 into the tower 13, through the treating material, the perforations in the shelf 14 and out through the pipe 19 to the condenser. The valve 25 is opened sufficiently to allow the treating material to be fed into the tank through the spout 24 where it is scattered by means of the spreader 26 on to the shelf 14. The pitch of the shelf 14 is such that the treating material will move by gravity down the shelf toward the spout 15 through which it is discharged into the hopper 16, the valve 27 being regulated to discharge the treating material at the same rate that it is fed into the tank through the spout 24. Both the valves 25 and 27 are so regulated that by the time the treating material has absorbed enough deposit to render it practically inactive, it has reached the discharge spout 15. While the shelf is permeable to vapors and liquids, it is impermeable to the treating material, so that none of the treating material escapes into the bottom part of the tank. Fresh treating material is charged into the hopper 23 as the supply therein becomes low and the spent treating material is drained out through the spout 28 after it has been subjected to steam admitted through the pipe 32 to vaporize any hydrocarbons that may have condensed in the treating material which are then carried out through the pipe 33 and pipe 19 to the condenser. The operation of this device may be continuous as the spent treating material is continuously removed and fresh treating material added. There need be no cessation of operations in order to recharge the treating tower.

In the refining of cracked hydrocarbon products the treating material used may be fuller's earth or other equivalent catalytic or adsorptive material which causes polymerization of the unstable unsaturated hydrocarbons present in the cracked product. Liquid polymers are thus formed in the catalytic material and are drained therefrom through the perforations in the shelf that supports the treating material. Such polymers are separated from the treated vapor by being led out of the treating tower through the pipe 30, while the treated vapors pass on through the pipe 19 to the condenser.

Provision may be made to prevent excessive condensation of the vapor in the tower 13 by providing the tower with a layer of heat insulating material 13a or when desired the vapor may be superheated by suitable means not shown. If desired, the vapor may be caused to circulate around the tower 13 before entering it or it may if desired be circulated around the hopper 23 to preheat the treating material contained therein, or steam may be used to preheat the treating material in the hopper when desired.

Instead of causing the vapors to flow down through the treating material, they may be caused to flow up through it. For this purpose, there is provided a pipe 35 leading from the pipe 12 to the bottom of the tower and a pipe 36 leading from the top of the tower to the pipe 19. With the valves 37 and 38 open and the valves 39 and 40 closed, the vapor will enter at the top, flow down through the treating material, and be discharged at the bottom. With the valves 37 and 38 closed and the valves 39 and 40 open, the vapor will enter at the bottom, flow up through the treating material, and be discharged from the top. Flow of treating material through the spout 24 prevents escape of the vapor through the spout.

The shelf 14 is preferably so arranged that the vapor to be treated is forced to pass through a considerable body of treating material before it can pass through the perforations. This is accomplished by providing perforations only halfway up the shelf and at the start of the operation maintaining the treating material at a level approximating the top of the shelf. As the treating material becomes spent, the valve from the top hopper is opened and the level of the treating material is gradually built up until the height in the tower is that best suited to operation, after which it is maintained by so regulating the valves that rates of inflow and outflow of the treating material to and from the treating tower are substantially the same. The vapors are thus subjected to a sufficient amount of the treating material to insure proper treatment and efficient utilization of the treating material.

Referring now to Fig. 3, 50 represents the treating tower and 51 the supply hopper discharging into the tower 50 through the spout 52 controlled by the valve 53. The discharge hopper 54 receives the spent treating material from the tank 50 through the spout 55 controlled by valve 56. A discharge spout 57 is provided for the hopper 54 and is controlled by the valve 58. The vapor to be treated is introduced into the tank 50 near the bottom thereof through the pipe 59 and is discharged from the top through the pipe 60. Within the tower are arranged a plurality of conical baffle plates 61. A pipe 62 connects the discharge hopper 54 with the pipe 60 and a pipe 62a is provided in the hopper 54 for admitting steam. Steam may also be admitted to the tower 50 through the pipe 64. In the operation of this modification, the hopper 51 is charged with the treating material and the valve 53 opened to allow flow of treating material on to the baffle plates down through the tower 50 from the bottom of which it is discharged through the spout 55 into the hopper 54. The vapor to be treated enters the tank at the bottom through the pipe 59 and passes up through the tank 50 and out the pipe 60. In this passage up through the tank, it comes into contact with the stream of treating material flowing down through the tank, during which operation the desired treatment of the vapor is accomplished. The flow of the treating material through the tank is controlled by the valve 52 so that by the time it has lost its activity it has reached the bottom of the tower. The vapor therefore comes in contact with increasingly active treating material as it rises through the tank. The discharged treating material may be subjected to steam in the hopper 54 to vaporize any hydrocarbons that may have condensed in the treating material, and these vapors are carried out by the pipe 62 to the pipe 60 where they are led to a condenser.

Provision may be made to prevent excessive condensation of the vapor in the tower 50 by providing it with a layer of heat-insulating material 63, or, when necessary, the vapor may be superheated by suitable means not shown. If desired, the vapor may be caused to circulate around the tower before entering it or it may, if desired, be circulated around the hopper 51 to preheat the treating material contained therein, or steam may be used to preheat the treating material in the hopper if desired.

With either of the apparatuses above described, the treating material is removed from the treating tower as it becomes inactive and a fresh supply is provided so that the refining operation may continue without interruption. In either apparatus there will be a uniform action of the treating agent on the vapor to be treated. The poisoned treating material is constantly being replaced by fresh material and the treatment of the vapor is of uniform and unvarying intensity at a definite temperature, pressure and rate of flow of the vapors through the reaction chamber which may be determined so as to obtain the best results. The vapors will constantly be brought into contact with treating material which has not become inactive as there is no collection of spent material in the chamber.

When the above-described apparatus is used in connection with the treatment of cracked distillate, the treating material may be fuller's earth or other equivalent catalytic or adsorptive material which will cause polymerization of the unsaturated unstable hydrocarbon compounds present in such distillate. The use of the apparatus is not limited to treatment of cracked distillate with a catalytic agent, but may be used wherever it is desired to treat vapor by contact with a solid treating material.

It is understood, of course, that the apparatus above disclosed may be varied in structural details without in any way departing from the spirit of the invention as set forth in the appended claims.

What I claim and desire to secure by Letters Patent of the United States is:

1. In combination, a closed treating tower having a vapor inlet and outlet, and a shelf interposed between said inlet and outlet, said shelf comprising a perforated inverted cone, a wire mesh cloth covering the perforations on said cone and a slotted inverted cone on said cloth.

2. In combination, a closed treating tower having inlet and outlet ports, and a shelf interposed between said ports, said shelf comprising a funnel shaped perforated plate, a slotted inverted cone arranged over and adjacent the perforations and a wire mesh cloth between said plate and said cone.

3. In combination, a closed treating tower having inlet and outlet ports, a funnel-shaped plate interposed between said inlet and outlet, said funnel being perforated near its contracted portion only, a slotted inverted cone arranged over and adjacent said plate and a wire mesh cloth between said plate and said cone.

4. In an apparatus for refining cracked hydrocarbons by contact in vapor phase with solid adsorptive material, a closed tower, a funnel-like fluid-permeable shelf within said tower, means for continuously supplying fresh solid adsorptive material to and continuously withdrawing spent solid adsorptive material from said shelf, said means being sealed to prevent escape of vapor, a vapor inlet and a vapor outlet on opposite sides of said shelf whereby cracked hydrocarbon vapor is directed into intimate contact with solid adsorptive material continuously fed through said tower by gravity thereby effecting polymerization of the unstable, unsaturated compounds present in the vapor, and means for collecting refined vapor discharged from said tower through said outlet.

5. In an apparatus for refining cracked hydrocarbons by contact in vapor phase with solid adsorptive material, a closed tower, a funnel-like fluid-permeable shelf within said tower, means for continuously supplying fresh solid adsorptive material to and continuously withdrawing spent solid adsorptive material from said shelf, said means being sealed to prevent escape of vapor, a vapor inlet and a vapor outlet on opposite sides of said shelf whereby cracked hydrocarbon vapor is directed into intimate contact with solid adsorptive material continuously fed through said tower by gravity thereby effecting polymerization of the unstable, unsaturated compounds present in the vapor, means for collecting refined vapor discharged from said tower through said outlet, and drainage means for removing liquid from the bottom of said tower.

6. In an apparatus for contacting vapor with solid treating material, a closed treating tower, a sloping perforated shelf supported at its rim by said tower and terminating in a discharge spout extending through the bottom of the treating tower, a slotted plate supported by said shelf, a wire mesh cloth interposed between said plate and said shelf, and means for passing vapors through said tower in contact with treating material supported by said shelf.

7. In an apparatus for contacting vapor with solid treating material, a closed treating tower, a sloping perforated shelf supported at its rim by said tower and terminating in a discharge spout leading through the bottom of the tower, a wire mesh cloth overlying the perforations, a slotted inverted cone resting on said cloth, and means for passing vapors through said tower in contact with treating material supported by said shelf.

8. The method of refining cracked petroleum vapors to produce motor fuel substantially free from unstable compounds which tend to discolor on exposure to light and to form deposits which comprises passing the vapors through a zone containing a quantity of solid adsorptive material thereby polymerizing and removing from the vapors the undesirable compounds contained therein, continuously introducing fresh dry solid adsorptive material into said zone, and continuously withdrawing from said zone spent solid adsorptive material.

9. The method of refining cracked petroleum vapors to produce motor fuel substantially free from unstable compounds which tend to discolor on exposure to light and to form deposits which comprises passing the hydrocarbon vapors through a zone containing a quantity of solid adsorptive material supported for free drainage thereby polymerizing and removing from the vapors the undesirable compounds contained therein, continuously adding fresh dry solid adsorptive material to said zone, continuously withdrawing spent solid adsorptive material from said zone, draining liquid including polymers from said adsorptive material and continuously removing the same from the vicinity of said zone.

10. The method of refining cracked petroleum vapors to produce motor fuel substantially free from unstable compounds which tend to discolor on exposure to light and to form deposits which comprises passing the vapors upwardly through a zone containing a quantity of solid adsorptive material, thereby polymerizing and removing from the vapors the undesirable compounds contained therein, continuously introducing fresh dry solid absorptive material into the upper part of said zone and continuously withdrawing spent solid adsorptive material from the lower part of said zone.

11. The method of refining cracked petroleum vapors to produce motor fuel substantially free from unstable compounds which tend to discolor on exposure to light and to form deposits which comprises passing the vapors through a zone containing a quantity of solid adsorptive material, thereby polymerizing and removing from the vapors the undesirable compounds contained therein, continuously introducing fresh dry solid adsorptive material into said zone, continuously draining liquid including polymers from the adsorptive material while in said zone, and continuously and separately withdrawing spent solid adsorptive material from said zone.

12. The method of refining cracked petroleum vapors to produce motor fuel substantially free from unstable compounds which tend to discolor on exposure to light and to form deposits which comprises passing the hydrocarbon vapors through a zone containing a quantity of solid adsorptive material supported for free drainage thereby polymerizing and removing from the vapors unstable compounds contained therein, continuously adding fresh dry solid adsorptive material to said zone, continuously draining liquid including polymers from said adsorptive material while in said zone and continuously and separately withdrawing spent solid adsorptive material from said zone.

13. The method of removing gum-forming and color-imparting bodies from mineral oil distillates containing unsaturated compounds, which comprises introducing vapors of the distillate into a treating zone, and bringing into direct contact with said vapors while in motion in said zone particles of dry finely divided fuller's earth temporarily suspended in said vapors.

14. The method of removing gum-forming and color-imparting bodies from mineral oil distillates containing unsaturated compounds, which comprises introducing vapors of the distillate into a treating zone, introducing dry finely divided fuller's earth into said zone, and causing particles of the fuller's earth to fall through said vapors countercurrent thereto and in direct contact therewith.

15. The method of removing gum-forming and color-imparting bodies from mineral oil distillates containing unsaturated compounds, which comprises introducing vapors of the distillate into a treating zone, introducing dry finely divided fuller's earth into said zone, causing the particles of the fuller's earth to fall through said vapors countercurrent thereto and in direct contact therewith, and prolonging the period of contact by imparting to the vapors a velocity which retards the fall of the fuller's earth.

16. The method of refining petroleum products containing unstable hydrocarbon compounds which comprises introducing the same in vapor phase into a treating zone, introducing finely divided solid adsorptive material into said zone and causing particles of the adsorptive material to fall through said vapor countercurrent thereto and in direct contact therewith.

17. The method of refining petroleum products containing unstable hydrocarbon compounds which comprises introducing the same in vapor phase into a treating zone, introducing finely divided solid adsorptive material into said zone, causing the particles of adsorptive material to fall through said vapor countercurrent thereto and in direct contact therewith and prolonging the period of contact by imparting to the vapor a velocity which retards the fall of the adsorptive material.

18. The method of refining petroleum products containing unstable hydrocarbon compounds which comprises introducing the same in vapor phase into a treating zone, introducing finely divided solid adsorptive material into said zone and causing particles of the adsorptive material to fall through said vapor counter-current thereto and in direct contact therewith, and separately withdrawing the treated vapor and spent adsorptive material.

19. The method of refining petroleum products containing unstable hydrocarbon compounds which comprises introducing the same in vapor phase into a treating zone, introducing finely divided solid adsorptive material into said zone, causing the particles of adsorptive material to fall through said vapor counter-current thereto and in direct contact therewith and prolonging the period of contact by imparting to the vapor a velocity which retards the fall of the adsorptive material, and separately collecting the treated vapor and spent adsorptive material.

20. The method of refining petroleum products containing unstable hydrocarbon compounds which comprises introducing the same in vapor phase into the lower portion of a treating zone, introducing dry finely divided solid adsorptive material into the upper portion of the treating zone thereby bringing into direct contact with the vapor while in motion in said zone particles of dry finely divided solid adsorptive material temporarily suspended in said vapor.

21. The method of refining petroleum products containing unstable hydrocarbon compounds which comprises introducing the same in vapor phase into the lower portion of a treating zone, introducing finely divided solid adsorptive material into the upper part of the treating zone and imparting to the vapor a velocity which retards the fall of the adsorptive material through said vapor.

THOMAS T. GRAY.